United States Patent [19]

Haque et al.

[11] Patent Number: 4,875,812
[45] Date of Patent: Oct. 24, 1989

[54] CUTTING TOOL EMPLOYING A DOUBLE PIN RETENTION ASSEMBLY

[75] Inventors: Sazzadul Haque, Troy; Thomas O. Floyd, Sterling Heights; Nick Savas, Dearborn; Walter H. Kelm, Mt. Clemens, all of Mich.

[73] Assignee: Carboloy Inc., Warren, Mich.

[21] Appl. No.: 180,242

[22] Filed: Apr. 11, 1988

Related U.S. Application Data

[63] Continuation-in-part of Ser. No. 936,275, Dec. 1, 1988, abandoned.

[51] Int. Cl.$^4$ .................. B23B 29/04; B23B 29/12
[52] U.S. Cl. .................................. 407/104; 407/105
[58] Field of Search ................... 407/103, 104, 105

[56] References Cited

U.S. PATENT DOCUMENTS

| | | | |
|---|---|---|---|
| 3,341,920 | 9/1967 | Kelm | 407/104 |
| 3,341,921 | 9/1967 | Weller et al. | 407/104 |
| 3,341,923 | 9/1967 | Kelm | 407/104 |
| 3,648,341 | 3/1972 | Viellet | 407/104 |
| 3,925,868 | 12/1975 | Singh | 407/103 |
| 4,621,955 | 11/1986 | Briese | 407/103 |

FOREIGN PATENT DOCUMENTS 2041797  9/1980  United Kingdom ............... 407/105

Primary Examiner—Robert P. Olszewski
Assistant Examiner—William E. Terrell
Attorney, Agent, or Firm—Hedman, Gibson, Costigan & Hoare

[57] ABSTRACT

A double retention pin assembly for securely locking a cutting insert in a recess of a cutting tool wherein the cutter body has an axial hole having a biaxial orientation, a primary retention pin is inserted into the axial hole along one of said axes and then angled with respect to said axis, and a secondary retention pin insertable into the axial hole of the primary retention pin and having the same angular orientation as the angled primary retention pin, said secondary retention pin exerting both a radial and axial locking force against the cutting insert.

8 Claims, 4 Drawing Sheets

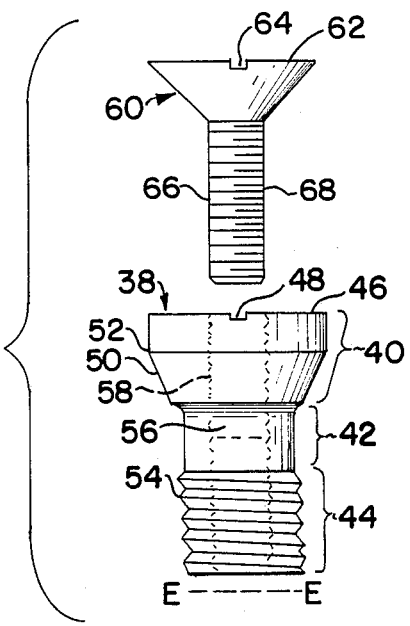
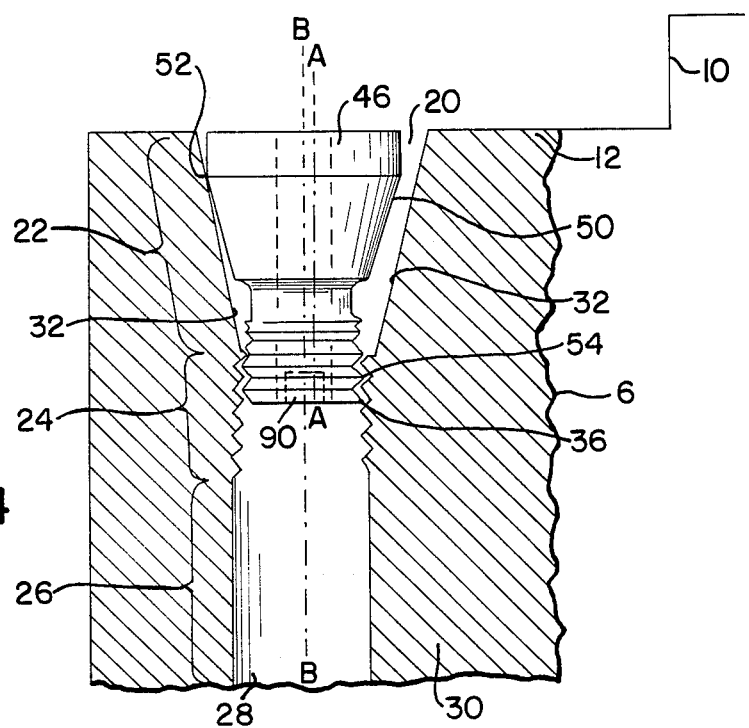

CUTTING TOOL EMPLOYING A DOUBLE PIN RETENTION ASSEMBLY

This is a continuation-in-part application of U.S. Ser. No. 936,275 filed Dec. 1, 1986, now abandoned.

FIELD OF THE INVENTION

The present invention is directed to a cutting tool of the type used in the machining of metal or metal alloys in which a disposable insert hard cutting tool is releasably held in a tool holder and specifically to a double retention pin-type retaining means for retaining the disposable cutting insert in a pocket of the cutting tool. The cutting tool insert remains fixed in the tool pocket when subjected to the stresses of machining operations and is especially suited for on-edge cutting tool inserts.

BACKGROUND OF THE INVENTION

Cutting tools having a pin-type retaining means are known in the art. For example, Kelm, U.S. Pat. Nos. 3,341,920 and 3,341,923 disclose pin-type retaining means insertable into an axial hole of the cutting tool, wherein when the pin is driven axially into the hole, the pin forces the cutting insert radially against the supporting shoulder of the tool body to thereby lock the cutting insert in place.

As the threads of the pin engage the corresponding grooves of the tool body, contact is made between the central tapered portion of the pin and the corresponding tapered portion of the axial hole in the tool body. As a result, the pin is forced laterally toward the shoulder of the recess against which the cutting insert rests providing a firm lock of the cutting insert against the shoulder.

More specifically as shown in FIGS. 2 and 3 of U.S. Pat. No. 3,341,920, the portion of the axial hole adjacent the base of the recess is tapered inwardly from the base of the recess to form a conical portion having a central axis identified by the line A—A. The remaining threaded portion of the axial hole in the recess of the tool body is cylindrical and has a central axis B—B offset from the axis A—A of the conical portion of the hole. The axis A—A is offset from the axis B—B in the direction toward the supporting shoulder of the shank. As a result, a significant force is applied against the cutting insert by the pin to thereby lock the same against the supporting shoulder U.S. Pat. Nos. 3,341,920 and 3,941,923 are incorporated herein by reference.

Such retention pins also have an axial hole in the bottom threaded portion of the pin extending upward toward the tapered section of the pin. The axial hole has grooves which mate with a drive means such as a hex wrench to provide a greater locking force at the bottom of the pin These prior art devices are particularly suited for so-called lay-down type cutting inserts. However, such devices do not satisfactorily inhibit movement during cutting operations when on-edge cutting inserts are employed This is because the retention force generated by the pin is directed primarily radially in the direction of the shoulder of the recess and the only axial force is that due to the friction engagement of the cutting insert against the locking shoulders. The cutting forces generated in the axial direction of the locking pin may exceed the frictional force thereby resulting in movement of the cutting insert which can lead to tool failure To overcome the problems with on-edge type of cutting inserts, tool clamps have been used which apply a clamping force against the top surface of the cutting insert substantially perpendicular to the cutting edge to maintain the same in the locked position The clamp is used in conjunction with pin-type retaining means described previously to provide a locking force exceeding that of the frictional force.

The use of a clamp in conjunction with pin-type retaining means has three primary disadvantages. First, the clamp is bulky and can prevent or inhibit access to certain workpieces and therefore, cannot be used in some machining operations.

Second, additional time and effort must be expended to lock and unlock the clamp and the cutting insert. A third disadvantage is that the clamp and those tools which are used to lock and unlock the clamp add significantly to the cost of the cutting tool. These disadvantages have made the use of clamps with pin-type retaining means of limited value for on-edge cutting tools.

The present invention overcomes the disadvantages of the aforementioned prior pin-type retaining means by employing a double pin retention assembly which provides a locking force not only radially towards the supporting shoulder but also axially to provide an axial locking force which greatly exceeds the frictional force between the cutting insert and the recess. Furthermore, the double pin retention assembly of the present invention eliminates the need for cumbersome and expensive tool clamps.

It is therefore an object of the present invention to provide a cutting tool having a double pin-type retaining means which provides both a radial and axial locking force to more securely retain the cutting insert in the pocket of the cutting tool.

It is a further object of the invention to provide a cutting tool having a double pin-type retaining means especially suited for locking an on-edge cutting insert so that movement during cutting operations is substantially eliminated and tool failure is significantly reduced.

SUMMARY OF THE INVENTION

In general, the cutting tool of present invention comprises a tool body having a recess including a base and at least one shoulder for supporting a cutting insert.

The cutting insert has a first axial hole which is alignable with a second axial hole opening into the base of the recess and extending at least through a portion of the tool body. At least a portion of the second axial hole comprises means for releasably engaging a primary retention pin therein which has a third axial hole therein for receiving a secondary retention pin.

The second axial hole has an upper portion having a longitudinal axis which is offset from the axis of that portion of the second axial hole containing the means for releasably engaging the primary retention pin.

The primary retention pin is insertable into the second axial hole and secured therein by the engaging means. The primary retention pin is adapted to move from a first position wherein the longitudinal axis is substantially parallel to the engaging means to a second position where the longitudinal axis of the primary retention pin is tilted in the direction toward the shoulder of the recess.

The secondary retention pin has a neck section which is adapted to exert pressure contact against the wall forming the first axial hole of the cutting insert. The body of the secondary retention pin is secured within the third axial hole of the primary retention pin.

In operation, the primary retention pin is driven into the second axial hole until it is secured by the engaging means therein. As the primary retention pin is driven deeper into the second axial hole it is forced to tilt in the direction of the shoulder of the recess. The cutting insert is then placed on the recess with the first axial hole aligned with the second axial hole. The secondary retention pin is then inserted through the first axial hole of the cutting insert and into the third axial hole of the primary retention pin along the same tilted axis of the primary retention pin.

As the secondary retention pin is driven into the primary retention pin it exerts a locking force against the cutting insert both radially in the direction of the shoulder of the recess and axially in the direction of the base of the recess. This is due to the same angled position of the secondary retention pin within the primary retention pin which results from the axis of the primary retention pin being tilted upon insertion into the second axial hole of the tool body.

As a result, the double retention pin assembly of the present invention provides a significant radial and axial locking force against the cutting insert. The axial locking force greatly exceeds the axial frictional force associated with previous retention pin assemblies. The double retention pin assembly is therefore able to withstand both the radial and axial cutting forces generated during machining operations to substantially reduce movement of the cutting insert during machining operations.

BRIEF DESCRIPTION OF THE DRAWINGS

The following drawings in which like reference characters indicate like parts illustrate embodiments of the invention and are not intended to limit the invention as encompassed by the claims of the application.

FIG. 3 is an enlarged, exploded view of an embodiment of a primary and secondary retention pin employed in the present invention;

FIG. 4 is a cross-sectional view similar to FIG. 2 showing the primary retention pin in the first position within the axial hole of the cutter body;

DETAILED DESCRIPTION OF THE INVENTION

Figure 1:
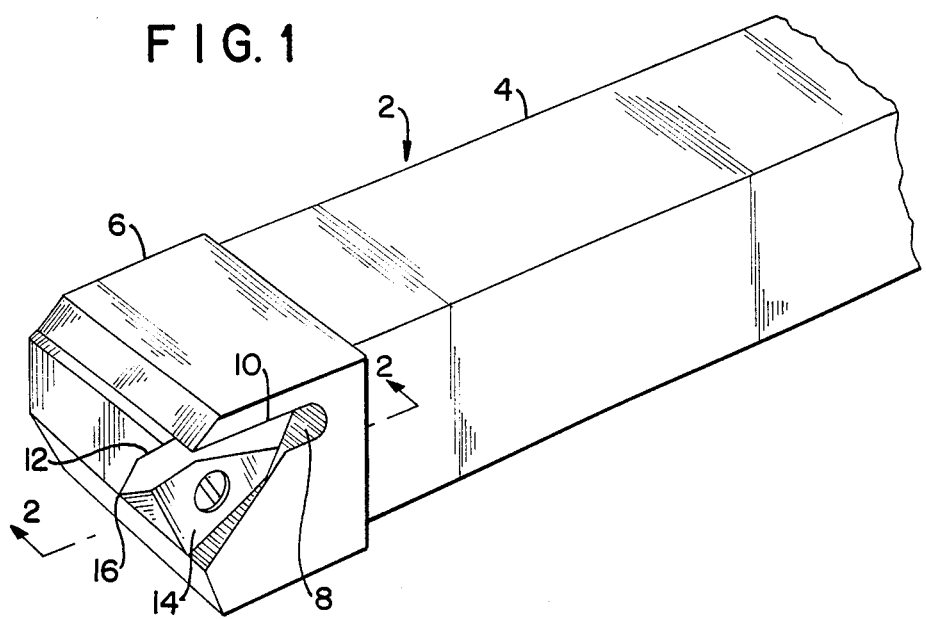
FIG. 1 is a perspective view of an on-edge type cutting tool in accordance with the present invention.
Figure 6:
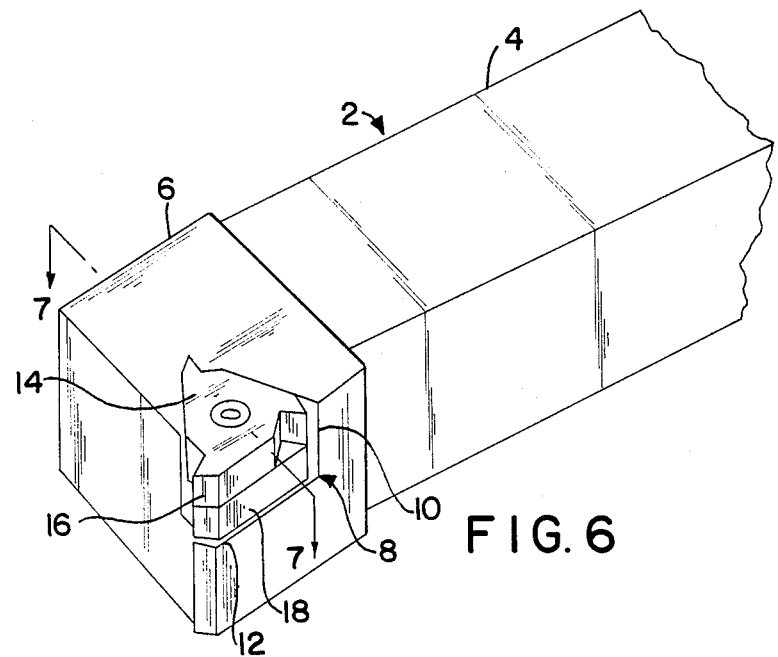
FIG. 6 is a perspective view of another embodiment of the cutting tool of the present invention employing an insert seat for supporting the cutting insert.

Referring to the drawings and particularly to FIGS. 1 and 6, a cutting tool 2 of the present invention includes a shank 4 which is inserted into a suitable cutting machine (not shown). At the upper end of the shank 4 is a cutter body 6 having therein a recess 8 formed by at least one shoulder 10 and a base 12 to provide support for a cutting insert 14 having at least one cutting edge 16. The cutting insert 14 may have a triangular shape as shown in FIG. 1 or any other customary shape such as a square, rectangle, diamond, etc, The cutting tool 2 shown in FIG. 1 is an on-edge type cutting tool wherein the cutting insert rests on its end. A lay-down type cutting tool is shown in FIG. 6. In this embodiment an insert seat 18 is positioned between the cutting insert 14 and the base 12 of the recess 8 as described in detail hereinafter.

Figure 2:
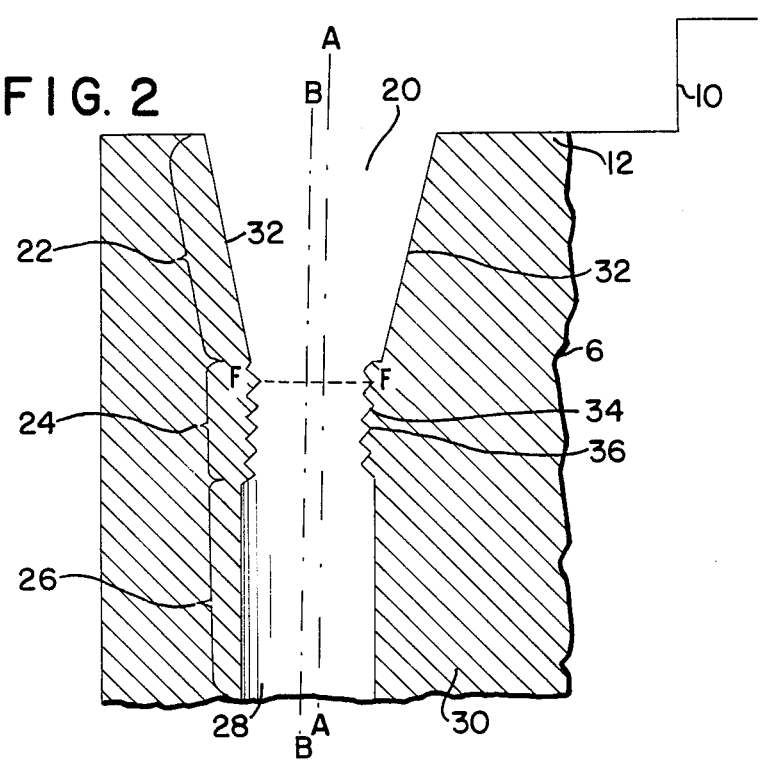
FIG. 2 is an expanded cross-sectional view taken along line 2—2 of FIG. 1 showing the axial hole in the cutter body.

As shown in FIG. 2, the cutter body 6 has an axial hole 20 which extends at least through a portion of the cutter body 6. The axial hole 20 has an upper portion 22, an engaging means containing portion 24, and, optionally, a lower portion 26 which has an opening 28 exiting the bottom portion 30 of the cutter body 6.

The upper portion 22 of the axial hole 20 has an inwardly tapered side 32 extending from the base 12 of the recess 8 to the engaging means portion 24 of the axial hole 20. The engaging means portion 24 has a substantially cylindrical cross-section defined by a wall 34 having grooves 36 on the surface thereof.

The longitudinal axis A—A of the upper portion 22 is offset from the longitudinal axis B—B of the engaging means portion 24 in the direction of the shoulder 10 of the recess 8.

As shown in FIG. 3, a primary retention pin 38 for use in cutting tools of the present invention includes an upper section 40, a midsection 42 and an externally threaded lower section 44. The upper section 40 includes a substantially cylindrical head 46 having a notch 48 which is engaged by a drive means (not shown) such as a screwdriver when the primary retention pin 38 is driven into the axial hole 20 of the cutter body 6.

The upper section 40 also comprises a tapered wall 50 which meets the cylindrical head 46 at a surface 52. The surface 52 presses against the tapered wall 32 of the axial hole 20 when the primary retention pin 38 is driven into the cutter body 6 as described hereinafter.

The lower section 44 of the primary retention pin 38 has a series of threads 54 which engage the corresponding grooves 36 in the engaging means portion 24 of the axial hole 20 for securely anchoring the lower section 44 of the primary retention pin 38 in the axial hole 20 of the cutter body 6.

Running centrally through the length of the primary retention pin 38 is an axial hole 56 having grooves 58 on the surface thereof for engaging corresponding threads of a secondary retention pin 60 when the secondary retention pin 60 is driven into the primary retention pin 38.

As shown in FIG. 3, the secondary retention pin 60 includes a tapered head 62 having a notch 64 which is engageable by a suitable drive means such as a screwdriver to drive the secondary retention pin 60 into locking engagement within the axial hole 56 of the primary retention pin 38. The tapered head 62 rests within the V-shaped groove formed by the tapered wall of the cutting insert 14 and presses against the tapered wall when the secondary retention pin 60 is driven into the primary retention pin 38.

The secondary retention pin 60 also has a substantially cylindrical body 66 having external threads 68 thereon which mate with the grooves 58 on the surface of the axial hole 56 within the primary retention pin 38. When the secondary retention pin 60 is driven into the axial hole 56 of the primary retention pin 38, the threads 68 engage the grooves 58 to securely lock the secondary retention pin 60 within the primary retention pin 38.

Referring to FIG. 4, when the primary retention pin 38 is initially driven into the axial hole 20, the threads 54 of the lower section 44 engage the corresponding grooves 36 in the engaging means portion 24 of the axial hole 20. Because the longitudinal axis A—A of the upper portion 22 is offset from the axis B—B of the engaging means portion 24 in the direction of the shoulder 10 of the recess 8, the surface 52 of the primary retention pin 38 abuts against the tapered side 32 of the upper portion 22 of the axial hole 20.

The grooves 54 of the primary retention pin 38 are provided with a pitch diameter which is different than the pitch diameter of the corresponding grooves 36 in the engaging means portion 24 of the axial hole 20. As a result, when the primary retention pin 38 is initially inserted into the axial 20, there is a loose fitting relationship between the primary retention pin 38 and the engaging means portion 24 which enables the primary retention pin 38 to tilt or cock in the direction of the shoulder 10.

Figure 5:
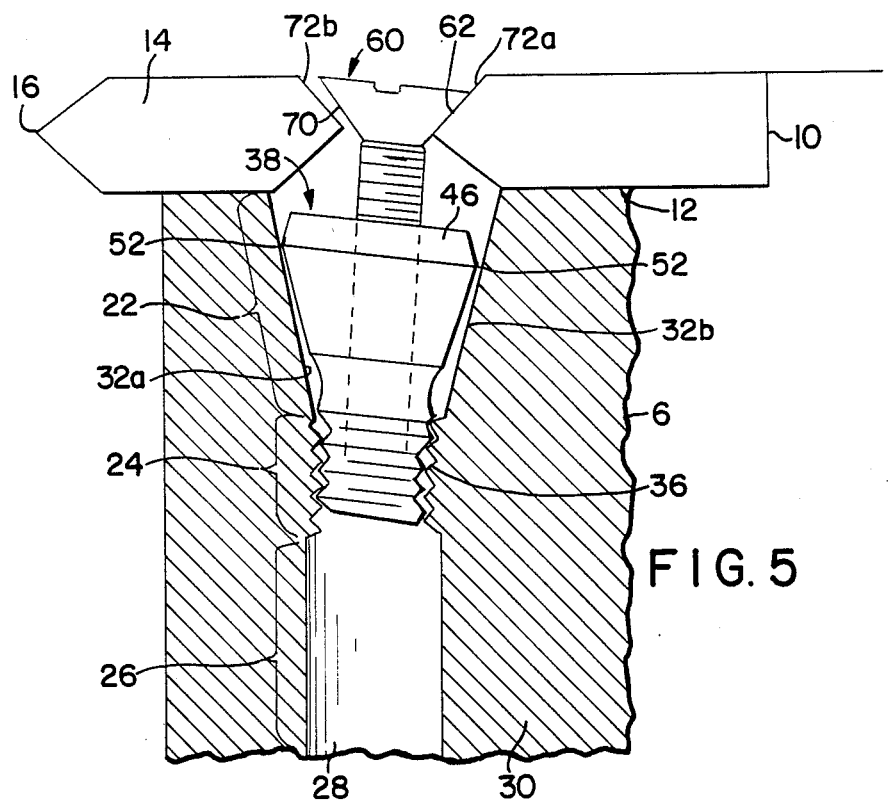
FIG. 5 is a cross-sectional view similar to FIG. 2 showing the primary and secondary retention pins in the operable position for locking the cutting insert in the recess of the cutting tool.

More specifically, as shown in FIG. 5, as the primary retention pin 38 is driven further into the axial hole 20, the resistance by the tapered side portion 32a against the surface 52 creates a force against the primary retention pin 38 in the direction of the shoulder 10. The primary retention pin 38 is able to relieve this force by tilting in the same direction until the surface 52 is prevented from further tilting when it abuts against the tapered side portion 32b. As a result, the primary retention pin 38 is angled with respect to the longitudinal axis B—B of the engaging means portion 24.

Tilting by the primary retention pin 38 is facilitated by the loose fitting relationship between the threads 54 of the primary retention pin 38 and the corresponding grooves 36 in the axial hole 20 which is established by employing different pitch diameters. The pitch diameter of the threads 54 of the primary retention pin 38 is shown by line E—E in FIG. 3 and the pitch diameter of the grooves 36 is shown by line F—F in FIG. 2. A detailed discussion of pitch diameters is set forth in Kelm U.S. Pat. No. 3,341,920 incorporated herein by reference.

Once the primary retention pin is in the tilted position shown in FIG. 5, the cutting insert 14 may be secured within the recess 8 in the following manner. The secondary retention pin 60 is placed through an axial hole 70 in the cutting insert 14. The axial hole 70 has a longitudinal axis coincident with the axis B—B of the engaging means portion 24 of the axial hole 20 of the cutter body 6. The axial hole 70 is formed by inwardly tapered walls 72a and 72b to provide a V-shaped groove for receiving the tapered head section 62 of the primary retention pin 60. As shown in FIG. 5, the axial hole 70 may be comprised of a pair of mirror image V-shaped grooves. The tapered walls 72a and 72b serve as a seat for the secondary retention pin 60. If the cutting insert 14 is provided with the mirror image V-shaped grooves, the cutting insert 14 may be inverted to provide a new cutting edge 16.

The secondary retention pin 60 is driven by a suitable drive means into the axial hole 56 of the primary retention pin 38 whereby the threads 68 engage the grooves 58 to provide a secure fit. Due to the tilt of the primary retention pin 38, the secondary retention pin 60 is likewise tilted at the same angle (see FIG. 7) with respect to the axis B—B. This causes the tapered head 62 of the secondary retention pin 60 to exert both a radial and axial force against the tapered wall 72a of the cutting insert axial hole 70 forcing the cutting insert 14 radially toward the shoulder 10 and axially toward the base 12.

The angle of tilt for the secondary retention pin 60 and the primary retention pin 38 necessary to accomplish the above-described radial and axial locking force can vary over a wide range of up to about 45°, preferably in the range of about ½° to 15°.

Figure 7:
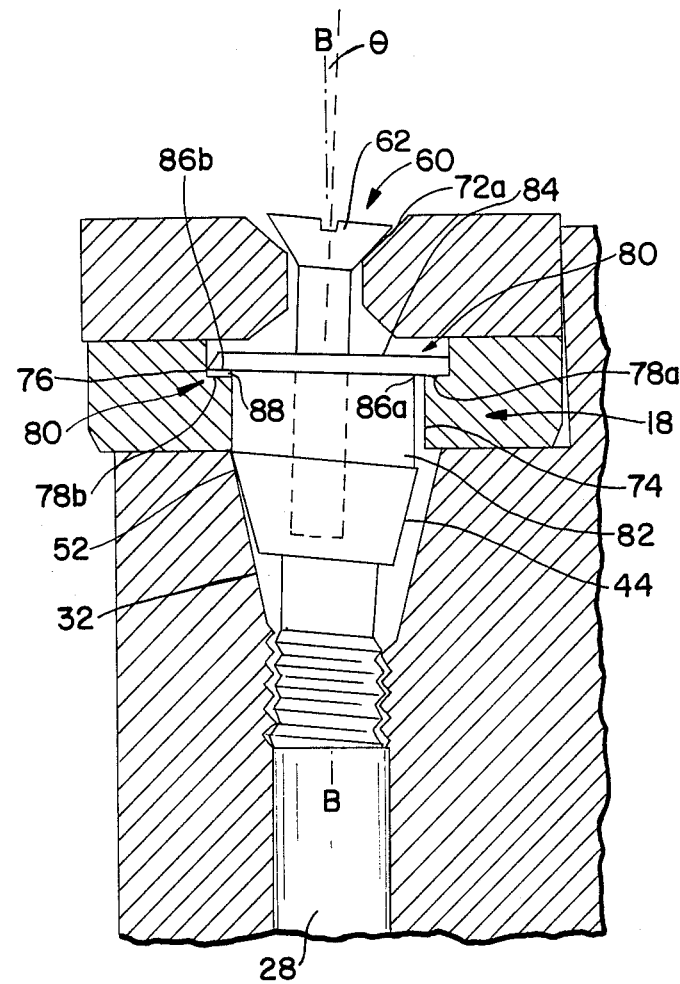
FIG. 7 is a cross-sectional view taken along line 7—7 of FIG. 6 showing the primary and secondary retention pins in the operable position for locking the cutting insert against the insert seat in the recess of the cutting tool.

In lay-down type tool holders of the present invention as shown in FIGS. 6 and 7, there is provided an insert seat 18 having an axial hole 74 therethrough and a counterbore 76 having opposed surfaces 78a and 78b.

The primary retention pin 38 is provided with an insert seat engaging section 80 which comprises a base 82, and an outwardly extending flange 84 having opposed bottom surfaces 86a and 86b. The locking of the cutting insert 14 in a lay-down type cutting tool is accomplished in the same way as previously described for the on-edge cutting tool.

When the primary retention pin 38 is driven into the engaging means portion 24, the bottom surface 86a of the flange 84 is caused to tilt downwardly and thereby press against the supporting surface 78a of the counterbore 76. This is shown in FIG. 7 by a gap 88 which develops between the raised bottom surface 86b of the flange 84 and the corresponding surface 78b of the counterbore 76.

The pressure exerted against the insert seat 18 is directed radially toward the shoulder 10 and axially against the base 12 of the recess 8 to thereby securely lock the insert seat against the recess 8. It will be noted that the surface 52 of the upper portion 22 of the primary retention pin 38 remains in contact with only a portion of the tapered wall 32 of the axial hole 20 because further tilting of the primary retention pin 38 is prevented by the pressure engagement of the bottom surface 86a and 86b of the flange 84 on the support surface 78a of the counterbore 76.

The secondary retention pin 60 is then driven into the axial hole 56 of the primary retention pin 38 in the manner previously described so that the tapered head 62 exerts pressure contact against the tapered wall 72a of the cutting insert 14 both radially and axially to thereby lock the cutting insert 14 against the shoulder 10 of the recess 8 and the insert seat 18.

In order to remove the cutting insert 14 from its secured position, the foregoing procedures are followed in reverse order. Specifically, the secondary retention pin 60 is removed and the cutting insert 14 is turned over or rotated to employ a new cutting edge 16 or discarded. The primary retention pin 38 may be removed (as well as the insert seat 18 if one is employed) or left in the cutter body 6 as desired when indexing a cutting insert 14. It is also possible to disengage the primary retention pin 38 from the axial hole 20 by inserting a suitable drive means through the opening 28 in the bottom portion 30 of the cutter body 6. In this event, the bottom end of the primary retention pin 38 is provided with a notch or hex hole 90 for receiving the drive means as shown in FIG. 4.

What is claimed is:

1. A cutting tool comprising:
   (a) a cutting insert having a first axial hole;
   (b) a cutter body comprising a recess at one end including a base and at least one shoulder connected to the base for supporting the cutting insert, and a second axial hole alignable with the first axial hole and extending from the recess into at least a portion of the cutter body, wherein the second axial hole comprises an upper portion and a lower portion containing means for reversibly locking therein a primary retention pin at an angle with respect to the axis of the lower portion, said upper portion comprising an inwardly tapered wall extending from the recess thereby forming a conical-shaped section having a longitudinal axis offset from the axis of the lower portion;

(c) a primary retention pin adapted to be reversibly locked in the second axial of the cutter body at said angle and comprising a third axial hole extending through at least a portion of the primary retention pin, means in said third axial hole for reversibly locking a secondary retention pin therein, and a body having a top end and a bottom end and an inwardly tapered side surface, at least a portion of the side surface adapted to engage the inwardly tapered wall of the upper portion of the second axial hole, said primary retention pin being movable from a first position therein the longitudinal axis of the primary retention pin is substantially parallel to the axis of the lower portion of the second axial hole, to a second position wherein said longitudinal axis is angled with respect to the axis of the lower portion of the second axial hole in the direction of the shoulder of the recess; and (d) a secondary retention pin adapted to be inserted through the first axial hole of the cutting insert and into the third axial hole in the primary retention pin and comprising means in conjunction with the third axial hole for reversibly locking the secondary retention pin therein and means for exerting pressure against the cutting insert in the direction of the recess and the shoulder of the recess.

2. The cutting tool of claim 1 wherein the means for reversibly locking the primary retention pin comprises a plurality of grooves and the bottom end of the primary retention pin comprises a plurality of corresponding threads, wherein the pitch diameter of said threads is different than the pitch diameter of said grooves to enable said primary retention pin to move from said first to said second position.

3. The cutting tool of claim 2 wherein the threaded bottom end of the primary retention pin comprises drive means engaging means, the second axial hole having a bottom end for receiving the drive means, wherein the drive means is inserted into the bottom end of the second axial hole to engage the bottom end of the primary retention pin to thereby secure the primary retention pin within the second axial hole.

4. The cutting tool of claim 1 wherein when said primary retention pin is in the first position the side surface of the body is in engagement with a surface of the inwardly tapered wall remote from the shoulder and when said primary retention pin is moved to the second position the side surface is in circumferential engagement with the inwardly tapered wall.

5. The cutting tool of claim 1, wherein the first axial hole comprises at least one V-shaped groove and the secondary retention pin comprises a tapered head section, said tapered head section being in pressure contact with a portion of the V-shaped grooved of the cutting insert nearest a shoulder of the recess when the secondary retention pin is in locking engagement within the primary retention pin.

6. The cutting tool of claim 1, wherein the secondary retention pin further comprises a substantially cylindrical body having threads on at least a portion of the exterior surface thereof and the third axial hole having a shape complimentary to the shape of the cylindrical body of the secondary retention pin, wherein the threads of the secondary retention pin are adapted to be in locking engagement with the grooves in the third axial hole when the secondary retention pin is driven into the third axial hole.

7. The cutting tool of claim 1 further comprising an insert seat for supporting the cutting insert and positioned on the base of the recess, said insert seat having a fourth axial hole alignable with the first and second axial holes and a counterbore including a ledge at the top end of the fourth axial hole, said primary retention pin having a flange in the upper portion thereof adapted to engage a portion of the ledge in the direction of the shoulder when the primary retention pin is in locking engagement within the second axial hole.

8. The cutting tool of claim 1, wherein said second retention pin is reversibly locked in the third axial hole when the primary retention pin in angled and locked in the second axial hole.

* * * * *